United States Patent
Kaiser et al.

(10) Patent No.: US 10,088,371 B2
(45) Date of Patent: Oct. 2, 2018

(54) TEMPERATURE DETECTION ASSEMBLY AND A CORRESPONDING LID FOR A COOKING POT

(71) Applicant: Electrolux Home Products Corporation N.V., Brussels (BE)

(72) Inventors: Kersten Kaiser, Rothenburg o. d. Tauber (DE); Michael Herzog, Rothenburg o. d. Tauber (DE); Fabienne Reinhard-Herrscher, Rothenburg o. d. Tauber (DE); Jennifer Burkhardt, Rothenburg o. d. Tauber (DE); Eva Holzgreve, Porcia (IT)

(73) Assignee: Electrolux Home Products Corporation N.V., Brussels (BE)

( * ) Notice: Subject to any disclaimer, the term of this patent is extended or adjusted under 35 U.S.C. 154(b) by 732 days.

(21) Appl. No.: 14/391,250

(22) PCT Filed: Mar. 7, 2013

(86) PCT No.: PCT/EP2013/054585
§ 371 (c)(1),
(2) Date: Oct. 8, 2014

(87) PCT Pub. No.: WO2013/164110
PCT Pub. Date: Nov. 7, 2013

(65) Prior Publication Data
US 2015/0114962 A1    Apr. 30, 2015

(30) Foreign Application Priority Data

May 4, 2012 (EP) .................................. 12166801
Oct. 24, 2012 (EP) .................................. 12189725

(51) Int. Cl.
*G01K 7/00*    (2006.01)
*G01K 11/26*    (2006.01)
(Continued)

(52) U.S. Cl.
CPC ............. *G01K 11/265* (2013.01); *A47J 27/62* (2013.01); *B65D 51/24* (2013.01); *F24C 15/10* (2013.01);
(Continued)

(58) Field of Classification Search
None
See application file for complete search history.

(56) References Cited

U.S. PATENT DOCUMENTS 3,776,456 A * 12/1973 Eising ..................... F24H 9/124
122/19.1
5,043,547 A * 8/1991 Lee ...................... H05B 6/6411
219/712

(Continued)

FOREIGN PATENT DOCUMENTS

CA        2579410 A1    8/2007
CN    200988639 Y    12/2007
(Continued)

OTHER PUBLICATIONS

International Search Report for PCT/EP2013/054585, dated Oct. 4, 2013.
(Continued)

*Primary Examiner* — Lisa Caputo
*Assistant Examiner* — Nasir U Ahmed
(74) *Attorney, Agent, or Firm* — Pearne & Gordon LLP

(57) ABSTRACT

The present invention relates to a temperature detection assembly (10) for a cooking pot (24). Said temperature detection assembly (10) comprises a straight and elongated bar (12), at least one SAW (surface acoustic wave) temperature sensor (10) arranged inside a lower end portion of the bar (12), a sensor antenna (16) connected to an upper end of the bar (12), and at least one handle (18) connected to the upper end of the bar (12). The SAW temperature sensor (10)

(Continued)

Figure 1:
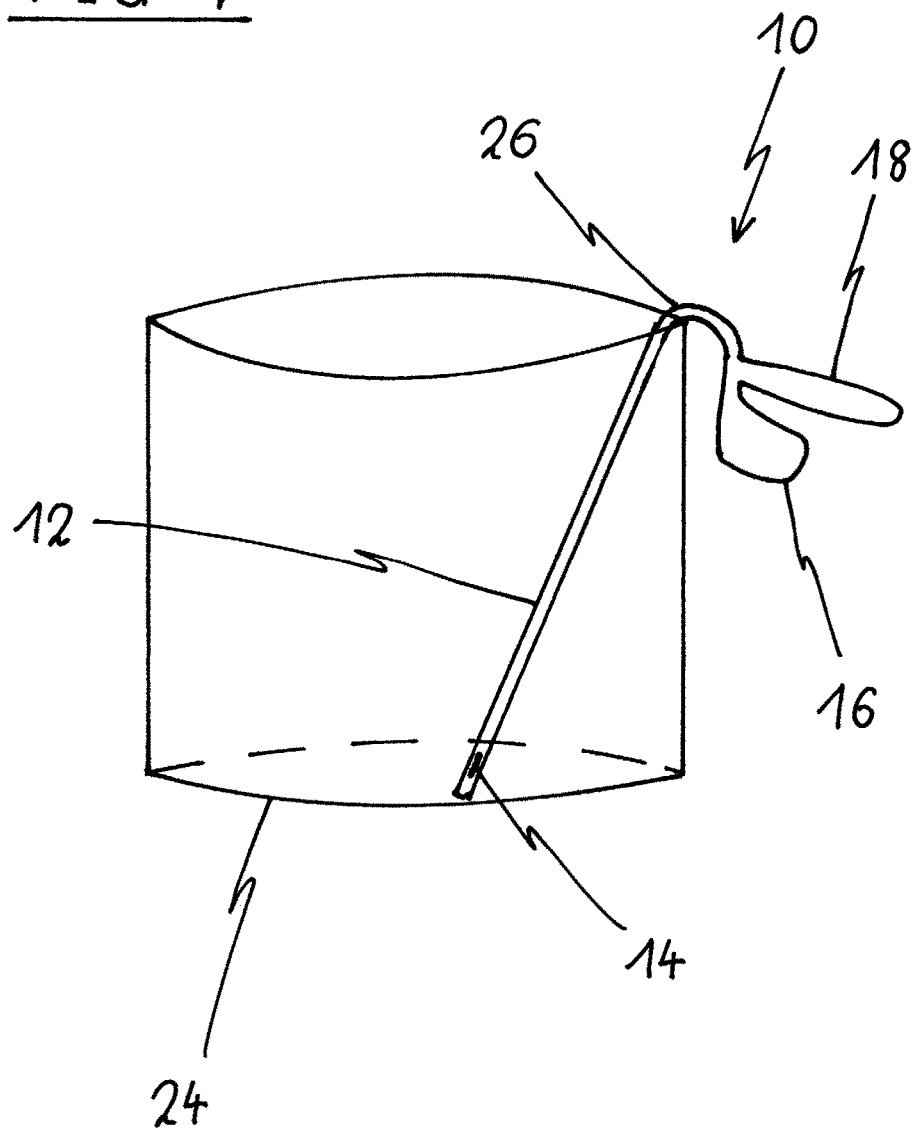

or a heat conducting element connected to said SAW temperature sensor (10) is spaced from a lower end of the bar (12) by a predetermined distance, wherein a non-heat-conducting material is arranged between the SAW temperature sensor (10) or the heat conducting element, respectively, and the lower end of the bar (12). Further, the present invention relates to a lid (20) for a cooking pot (24), wherein the lid (20) is provided for receiving a temperature detection assembly (10) with a straight and elongated bar (12). The lid (20) comprises an elongated guide tube (22) for receiving the bar (12) of the temperature detection assembly (10), wherein an outer diameter of the bar (12) is marginally smaller than an inner diameter the guide tube (22).

20 Claims, 3 Drawing Sheets

(51) Int. Cl.
  *A47J 27/62* (2006.01)
  *G01K 1/14* (2006.01)
  *B65D 51/24* (2006.01)
  *F24C 15/10* (2006.01)

(52) U.S. Cl.
  CPC ............ *G01K 1/14* (2013.01); *A47J 2202/00* (2013.01); *G01K 2207/06* (2013.01)

(56) References Cited

U.S. PATENT DOCUMENTS

| | | | | |
|---|---|---|---|---|
| 7,605,349 B2 * | 10/2009 | Gaynor | ................ | A47J 27/004 165/47 |
| 8,398,303 B2 * | 3/2013 | Kuhn | ................... | G01K 1/024 219/712 |
| 2002/0124737 A1 | 9/2002 | Bedetti et al. | | |
| 2003/0007544 A1 | 1/2003 | Chang et al. | | |
| 2004/0247015 A1 * | 12/2004 | Wojan | ................ | G01K 1/14 374/120 |
| 2008/0043809 A1 * | 2/2008 | Herbert | ................ | G01K 1/026 374/163 |
| 2009/0147824 A1 * | 6/2009 | Schafer | ................ | G01K 5/18 374/183 |
| 2009/0175315 A1 | 7/2009 | Schwegman | | |

FOREIGN PATENT DOCUMENTS

| | | |
|---|---|---|
| CN | 201008508 Y | 1/2008 |
| CN | 201429127 Y | 3/2010 |
| CN | 102283570 A | 12/2011 |
| EP | 1473554 | 11/2004 |
| EP | 1473554 A1 | 11/2004 |

OTHER PUBLICATIONS

English translation of Office action issued in counterpart Chinese Patent Application No. 201380023105.2, dated Jan. 19, 2016, 11 pages.

European Search Report issued in counterpart European Patent Application No. 12189725.0, dated Sep. 30, 2013, 10 pages.

Office action issued in counterpart Chinese Patent Application No. 201380023105.2, dated Mar. 8, 2017, 13 pages.

* cited by examiner

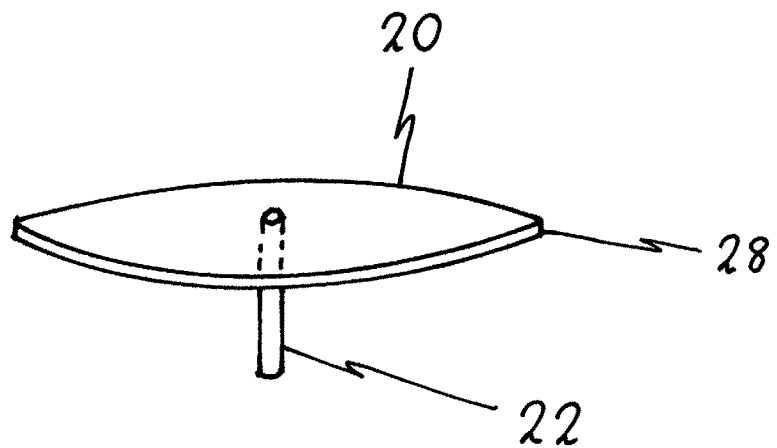
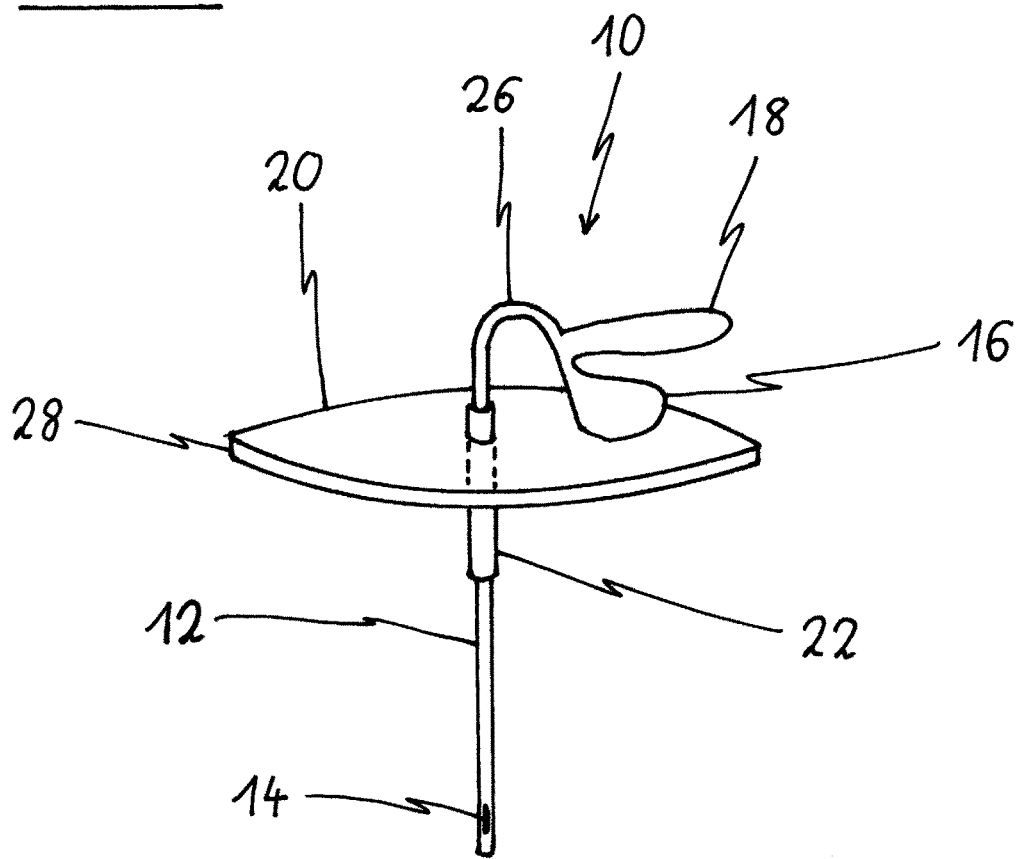

TEMPERATURE DETECTION ASSEMBLY AND A CORRESPONDING LID FOR A COOKING POT

The present invention relates to a temperature detection assembly for a cooking pot according to the preamble of claim 1. Further, the present invention relates to a lid for receiving a temperature detection assembly for a cooking pot according to the preamble of claim 12. Moreover, the present invention relates to the temperature detection system for a cooking pot according to the preamble of claim 16. Additionally, the present invention relates to a cooking hob provided for a temperature detection system according to the preamble of claim 19.

The temperature of a cooking pot on a cooking hob is a basic parameter for controlling the cooking process of food stuff inside said cooking pot. In the prior art there are several methods for detecting the temperature of the cooking pot on the cooking hob.

For example, in a cooking hob with a glass ceramic panel a temperature sensor is placed below said glass ceramic panel, on which the cooking pot is placed. The cooking hob with the glass ceramic panel includes induction coils or radiant heating elements. The detected temperature is used for the further cooking process of food stuff in the cooking pot.

In another example the temperature of a wall of the cooking pot is detected by a sensor from the outside of said cooking pot. Further, there is a cooking pot with integrated temperature sensors, wherein information about the temperature is transferred wireless to the cooking hob. Moreover, an oven with a wireless food probe using the surface acoustic wave (SAW) technology is known. The knowledge of these temperatures may also be used to create programs or algorithms in order to assist the user.

US 2002/0124737 A1 discloses a device for controlling a cooking process performed on a cooking hob. An elongated temperature detection assembly for a cooking pot includes a temperature sensor at its lower end and a handle and a transmitter at its upper end. The temperature detection assembly allows a wireless connection to a managing system of the cooking hob. A lid for the cooking pot includes a hole or a steam vent hole for receiving the temperature detection assembly. However, the user has to observe the exact position of the temperature sensor in order to obtain a reliable temperature measurement of the food stuff.

It is an object of the present invention to provide an improved temperature detection assembly and a corresponding lid for a cooking pot, which allows reliable temperature measurement of the food stuff without big attention by the user.

The object of the present invention is achieved by the temperature detection assembly for a cooking pot according to claim 1.

According to the present invention the SAW temperature sensor or a heat conducting element connected to said SAW temperature sensor is spaced from a lower end of the bar by a predetermined distance, wherein a non-heat-conducting material is arranged between the SAW temperature sensor or the heat conducting element, respectively, and the lower end of the bar.

The main idea of the present invention is the predetermined distance between the SAW temperature sensor and the lower end of the bar, or alternatively, the predetermined distance between the heat conducting element connected to the SAW temperature sensor and the lower end of the bar. The predetermined distance assures that the temperature of the bottom plate of the cooking pot does not disturb the temperature detection of the food stuff, in particular, if the lower end of the bar contacts the bottom plate of the cooking pot. The temperature is measured directly in the liquid or food inside the cooking pot. It is not necessary that the user pays attention to the exact position of the temperature detection assembly and the SAW temperature sensor. The use of the SAW technology allows that there is no battery and no other electric energy source required inside the temperature detection assembly.

Further, the sensor antenna and the handle may be connected to the upper end of the bar via a bowed section. The sensor antenna and the handle are indirectly connected to the upper end of the bar. The temperature detection assembly may be supported by an upper edge of a side wall of the cooking pot via said bowed section.

Preferably, the sensor antenna, the handle and/or the bowed section are covered by a food safe and heat resistant material, in particular by a silicone material. Moreover, the bar is made of stainless steel.

For example, the distance between the SAW temperature sensor or the heat conducting element connected to said SAW temperature sensor, respectively, and the lower end of the bar is between 5 mm and 20 mm, in particular 10 mm.

Further, the bar is a single-piece part and has a length between 10 cm and 20 cm, in particular 16 cm.

Alternatively, the bar is a telescopic bar with a variable length. For example, the length of the telescopic bar is variable between 8 cm and 16 cm. The telescopic bar allows that the length of the bar is adapted to the height of the cooking pot, so that the lower end of the bar is always in contact to the bottom of the cooking pot. Further, the telescopic bar allows an arrangement of the temperature detection assembly in such a way that the bar is arranged vertically inside the cooking pot.

Moreover, at least one distance element may be arranged besides and/or enclosing the sensor antenna, so that there is a minimum distance between the antenna and the metal of the cooking pot and/or the sensor antenna has a defined direction to the wall of the cooking pot.

For example, a flexible printed circuit board and/or a coax cable is arranged inside the bowed section.

Further, an outer portion of the bowed section (26) is made of silicone.

The object of the present invention is further achieved by the lid for a cooking pot according to claim 12.

According to the present invention the lid comprises an elongated guide tube for receiving the bar of the temperature detection assembly, wherein an inner diameter of the guide tube is marginally bigger than an outer diameter of the bar. The guide tube allows a stable arrangement of the temperature detection assembly.

Preferably, the longitudinal axis of the guide tube extends perpendicular to the plane of the lid. This allows a vertical arrangement of the temperature detection assembly.

According to a preferred embodiment of the present invention, a shorter portion of the guide tube may extend above the lid, while a longer portion of the guide tube may extend below the lid.

Additionally, the lid may comprise a border, wherein the border encloses a circular disk of the lid and extends downwards. The border restricts a sideways motion of the lid upon the cooking pot, so that the lid is suitable for each pot with a diameter smaller than the inner diameter of the lid inside the border.

Further, the present invention relates to a temperature detection system for a cooking pot, wherein said temperature detection system includes a temperature detection assembly and a lid for the cooking pot, wherein the lid is provided for receiving the temperature detection assembly, wherein the temperature detection system includes the temperature detection assembly and the lid mentioned above.

Preferably, the temperature detection system is provided for at least one ISM (industrial, scientific and medical) band.

In particular, the temperature detection system may be adaptable to at least one certain ISM band.

Moreover, the present invention relates to a cooking hob including a control unit, wherein the cooking hob is connected or connectable to the temperature detection assembly and/or to the temperature detection system as described above.

Preferably, the cooking hob comprises a reader antenna provided for the wireless connection to the sensor antenna of the temperature detection assembly, and a reader electrically connected to the control unit of the cooking hob.

Novel and inventive features of the present invention are set forth in the appended claims.

Figure 4:
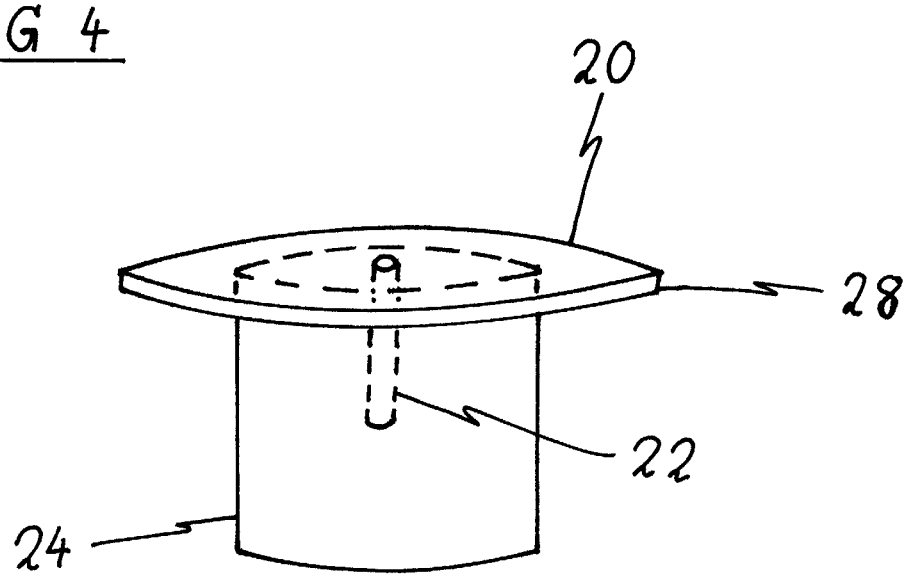
Figure 5:
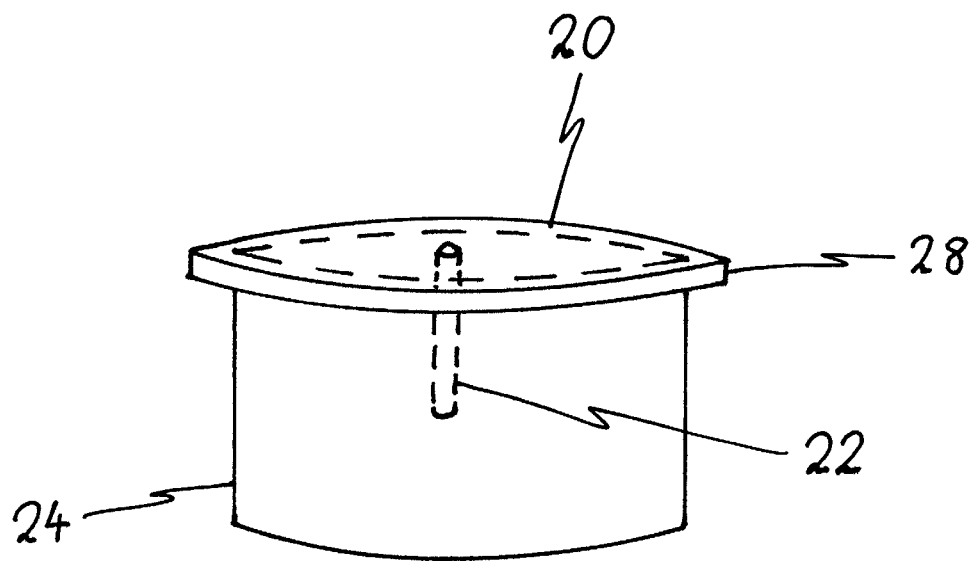

The present invention will be described in further detail with reference to the drawings, in which FIG. 1 illustrates a schematic perspective view of a temperature detection assembly for a cooking pot according to a preferred embodiment of the present invention, FIG. 2 illustrates a schematic perspective view of a lid for a cooking pot provided for receiving the temperature detection assembly according to the preferred embodiment of the present invention, FIG. 3 illustrates a schematic perspective view of the lid for the cooking pot and the inserted temperature detection assembly according to the preferred embodiment of the present invention, FIG. 4 illustrates a schematic perspective view of the lid for receiving the temperature detection assembly and a small cooking pot according to the preferred embodiment of the present invention, and FIG. 5 illustrates a schematic perspective view of the lid for receiving the temperature detection assembly and a big cooking pot according to the preferred embodiment of the present invention.

FIG. 1 illustrates a schematic perspective view of a temperature detection assembly 10 for a cooking pot 24 according to a preferred embodiment of the present invention. In FIG. 1 the temperature detection assembly 10 is a working position and partially arranged inside the cooking pot. A lower end of said temperature detection assembly 10 is supported by the bottom of the cooking pot 24. An upper portion of the temperature detection assembly 10 is supported by the upper edge of the sidewall of the cooking pot 24.

The temperature detection assembly 10 includes a straight and elongated bar 12. In this example, the bar 12 has a length of about 16 cm and a thickness of about 5 mm. Alternatively, the bar 12 is a telescopic bar with a variable length. For example, the length of said telescopic bar may be varied between 8 cm and 16 cm. Preferably, the bar 12 is made of stainless steel.

The telescopic bar allows that the length of the bar 12 is adapted to the height of the cooking pot 24, so that the lower end of the bar 12 is always in contact to the bottom of the cooking pot 24. Further, the temperature detection assembly 10 may be always positioned in such a way that the bar 12 is arranged vertically inside the cooking pot 24.

A surface acoustic wave (SAW) temperature sensor 14 is arranged inside the bar 12. The SAW temperature sensor 14 is arranged in the lower end portion of the bar 12. The SAW temperature sensor 14 is spaced from the lower end of the bar 12. Preferably, the SAW temperature sensor 14 is arranged about 10 mm away from the lower end of the bar 12. This assures that the SAW temperature sensor 14 detects the temperature of the water or the food stuff inside the cooking pot 24, but not the temperature of the bottom of said cooking pot 24. Further, the SAW temperature sensor 14 may be arranged more than 10 mm away from the lower end of the bar 12, wherein a thermal conductor element connects the SAW temperature sensor 14 to a point spaced about 10 mm from the lower end of the bar 12.

The SAW technology of the SAW temperature sensor 14 allows that the temperature detection assembly 10 needs no battery and no other electric energy source required inside the temperature detection assembly.

Further, the temperature detection assembly 10 includes a sensor antenna 16 and a handle 18 at the upper end of the bar 12. The sensor antenna 16 allows a connection between the SAW temperature sensor 14 and a control unit of a cooking hob.

The arrangement of the temperature detection assembly 10 in the cooking pot 24 shown in FIG. 1 allows the temperature detection of food stuff in the open cooking pot 24. The temperature detection assembly 10 includes a bowed section 26 arranged between the bar 12 on the one hand and the sensor antenna 16 and handle 18 on the other hand. The bowed section 26 allows the supporting of the temperature detection assembly 10 by the upper edge of the sidewall of the cooking pot 24. In this example, the sensor antenna 16 and the handle 18 of the temperature detection assembly 10 are formed as separate parts, but connected to each other. Alternatively, the sensor antenna 16 may be integrated inside the handle 18, so that the sensor antenna 16 and the handle 18 form one compact part.

The sensor antenna 16, the handle 18 and/or the bowed section 26 of the temperature detection assembly 10 are covered by one or more food safe and heat resistant materials. Preferably, said materials are heat resistant up to 250° C. In particular, it is advantageous that the bowed section 26 is covered by the heat resistant material, since the bowed section 26 is always in a direct contact to the cooking pot 24. For example, the sensor antenna 16, the handle 18 and/or the bowed section 26 of the temperature detection assembly 10 are covered by silicone.

The sensor antenna 16 is positioned inside the food safe and heat resistant materials, so that a minimum distance between the antenna 16 and the metal of the cooking pot 24 is guaranteed. For this purpose a distance element besides or enclosing the sensor antenna 16 may be provided. Further, the food safe and heat resistant materials assure a position of the sensor antenna 16, so that the sensor antenna 16 has a defined direction to the wall of the cooking pot 24.

A coax cable is inside the bowed section 26 in order to connect the SAW temperature sensor 14 to the sensor antenna 16, wherein the coax cable is covered by silicone. The bowed section 26 covered by silicone may have a thickness of about 5 mm, which is the same thickness as the bar 12. Further, the coax cable is covered by silicone with metal inside. In this case, the electric connection is maintained, if the coax cable breaks. The thickness of the silicone with metal inside may be about 2 mm.

The part of the temperature detection assembly 10 between the spit, where the SAW temperature sensor 14 is included, and the sensor antenna 16, e.g. the bowed section 26, is designed in such a way, that the shape of that part fits substantially to every pot rim on the one hand and the cooking pot 24 is closable by each conventional lid 20 on the other hand. This part is put around the rim of the cooking pot 24. This guarantees that the SAW temperature sensor 14 is inside the cooking pot 24, while the sensor antenna 16 is outside the cooking pot 24. This part may be fixed or flexible. In the latter case, a flexible PCB (printed circuit board) may be inside that part. The maximal thickness of that part is about 2 mm. This part may be out of the heat resistant and food safe material.

FIG. 2 illustrates a schematic perspective view of a lid 20 for the cooking pot 24 provided for receiving the temperature detection assembly 10 according to the preferred embodiment of the present invention.

The lid 20 is substantially formed as a circular disk and comprises a guide tube 22. The guide tube 22 extends perpendicular to the plane of the lid 20. A smaller part of the guide tube 22 is above the lid 20, while a bigger part of said guide tube 22 extends below said lid 20. The lid 20 is provided for covering the cooking pot 24. In use, the guide tube 22 extends substantially along a vertical direction.

The guide tube 22 is provided for receiving the bar 12 of the temperature detection assembly 10. The temperature detection assembly 10 may penetrate the lid 20, wherein the SAW temperature sensor 14 is below the lid 20 and the sensor antenna 16, the handle 18 and the bowed section 26 are above the lid 20. Preferably, the inner diameter of the guide tube 20 is marginally bigger than the outer diameter of the bar 12. The guide tube 22 contributes to a stable position of the temperature detection assembly 10.

Further, the lid 20 comprises a small border 28 enclosing the circular disk. The border 28 extends downwards. The border 28 restricts a sideways moving of the lid 20 on the cooking pot 24. The lid 20 is suitable for each pot 24 with a diameter smaller than the inner diameter of the lid 20 inside the border 28.

The lid 20 is made of one or more heat resistant materials. For example, the lid 20 is made of metal, glass and/or a flexible heat resistant material, e.g. silicone. The outer side of the lid 20 may be of the silicone material or another flexible heat resistant material, while inside the lid 20 are metal and/or glass for fixing the temperature detection assembly 10.

FIG. 3 illustrates a schematic perspective view of the lid 20 for the cooking pot 24 and the inserted temperature detection assembly 10 according to the preferred embodiment of the present invention.

The bar 12 of the temperature detection assembly 10 is inserted in the guide tube 22. The temperature detection assembly 10 penetrates the lid 20. The SAW temperature sensor 14 is arranged below the lid 20. The sensor antenna 16, the handle 18 and the bowed section 26 are arranged above the lid 20.

The guide tube 22 allows a stable arrangement of the temperature detection assembly 10. In this example, the bar 12 of the temperature detection assembly 10 extends vertically. The lid 20 is provided for covering the cooking pot 24, so that the SAW temperature sensor 14 is arranged inside the cooking pot 24 and the sensor antenna 16, the handle 18 and the bowed section 26 are arranged above the cooking pot 24.

Since the SAW temperature sensor 14 is spaced from the lower end of the bar 12, the SAW temperature sensor 14 detects reliably the temperature of the water or the food stuff inside the cooking pot 24, but not the temperature of the bottom of said cooking pot 24. The position of the SAW temperature sensor 14 in the bar 12 allows a minimum distance between said SAW temperature sensor 14 and the bottom of the cooking pot 24.

FIG. 4 illustrates a schematic perspective view of the lid 20 for receiving the temperature detection assembly 10 arranged on a small cooking pot 24 according to the preferred embodiment of the present invention. The lid 20 covers said small cooking pot 24. The diameter of the cooking pot 24 is significantly smaller that the diameter of the lid 20. The lid 20 is suitable for cooking pots 24 having a diameter much smaller than the diameter of the lid 20.

FIG. 5 illustrates a schematic perspective view of the lid 20 for receiving the temperature detection assembly 10 arranged on a big cooking pot 24 according to the preferred embodiment of the present invention. The lid 20 covers said big cooking pot 24. In FIG. 5 the diameter of the cooking pot 24 is marginally smaller than the diameter of the lid 20.

FIG. 4 and FIG. 5 make clear that the lid 20 is suitable for arbitrary cooking pots 24 which are smaller than the lid 20.

The temperature detection assembly 10 and the temperature detection system, respectively, are provided for the corresponding cooking hob. Said cooking hob is provided for the wireless connection to the temperature detection assembly. For this purpose, the cooking hob includes a reader and a reader antenna arranged on or inside said cooking hob.

The reader antenna is provided for the wireless connection to the sensor antenna 16. The reader is provided for emitting electromagnetic waves to the SAW temperature sensor 14 via the reader antenna and the sensor antenna 16. Further, the reader is provided for receiving electromagnetic waves from the SAW temperature sensor 14 via the sensor antenna 16 and the reader antenna. The electromagnetic waves emitted by the reader provide the SAW temperature sensor 14 with energy. The electromagnetic waves emitted by the SAW temperature sensor 14 provide the reader with information about the detected temperature.

The reader is electrically connected to the control unit of the cooking hob. The information about the temperature can be used for controlling the cooking process. For example, the reader and the reader antenna are arranged in the centre between cooking zones of the cooking hob. Thus, the distances between the reader antenna on the one hand and possible cooking pots on the cooking zones on the other hand are nearly equal.

The temperature detection assembly 10 with the SAW temperature sensor 14 and the sensor antenna 16 as well as the reader and the reader antenna may be adapted for different frequency bands. In particular, the temperature detection assembly 10, the reader and the reader antenna are adapted for the usual ISM (industrial, scientific and medical) bands. The ISM bands are standardized for certain ranges of frequencies. The ISM band for Europe has the frequency range between 433.05 MHz and 434.79 MHz. The ISM band for the USA has the frequency range between 902 MHz and 928 MHz.

The temperature detection assembly 10 is closed. Further, there is no battery inside said temperature detection assembly 10. Thus, the temperature detection assembly 10 may be cleaned in a dishwasher.

The temperature detection system is suitable for any kind of cooking hob. For example, the temperature detection system may be used for a gas cooking hob, an induction cooking hob, a radiant cooking hob and/or solid plate cooking hob.

Additionally, the temperature detection assembly 10 is suitable for measuring the room temperature and/or the temperatures of vine, cheese, potatoes and the like. The detected temperature may be indicated by a display, e.g. by a display of the cooking hob.

Although an illustrative embodiment of the present invention has been described herein with reference to the accompanying drawing, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 temperature detection assembly
12 bar
14 surface acoustic wave (SAW) temperature sensor
16 sensor antenna
18 handle
20 lid
22 guide tube
24 cooking pot
26 bowed section
28 border

The invention claimed is:

1. A temperature detection assembly (10) for a cooking pot (24), wherein said temperature detection assembly (10) comprises: a straight and elongated bar (12), at least one SAW (surface acoustic wave) temperature sensor (14) arranged inside a lower end portion of the bar (12), a sensor antenna (16) connected to an upper end of the bar (12), and at least one handle (18) connected to the upper end of the bar (12), wherein the SAW temperature sensor (14) or a heat conducting element connected to said SAW temperature sensor (14) is spaced from a lower end of the bar (12) by a predetermined distance, wherein a non-heat-conducting material extends from the SAW temperature sensor (14) or the heat conducting element, respectively, and to the lower end of the bar (12), wherein the non-heat-conducting material is arranged at a lower tip of the bar (12), wherein the distance between the SAW temperature sensor (14) or the heat conducting element connected to said SAW temperature sensor (14), respectively, and the lower end of the bar (12) is between 5 mm and 20 mm.

2. The temperature detection assembly (10) according to claim 1, wherein the sensor antenna (16) and the handle (18) are connected to the upper end of the bar (12) via a bowed section (26).

3. The temperature detection assembly (10) according claim 2, wherein a flexible printed circuit board and/or a coax cable is arranged inside the bowed section (26).

4. The temperature detection assembly (10) according to claim 2, wherein an outer portion of the bowed section (26) is made of silicone.

5. The temperature detection assembly (10) according to claim 1, wherein the sensor antenna (16), the handle (18) and/or the bowed section (26) are covered by a food safe and heat resistant material, in particular by a silicone material.

6. The temperature detection assembly (10) according to claim 1, wherein the bar (12) is made of stainless steel.

7. The temperature detection assembly (10) according to claim 1, wherein the distance between the SAW temperature sensor (14) or the heat conducting element connected to said SAW temperature sensor (14), respectively, and the lower end of the bar (12) is 10 mm.

8. The temperature detection assembly (10) according to claim 1, wherein the bar (12) is a single-piece part and has a length between 10 cm and 20 cm, in particular 16 cm.

9. The temperature detection assembly (10) according to claim 1, wherein the bar (12) is a telescopic bar with a variable length.

10. The temperature detection assembly (10) according to claim 9, wherein the length of the telescopic bar (12) is variable between 8 cm and 16 cm.

11. The temperature detection assembly (10) according claim 1, wherein at least one distance element is arranged besides and/or enclosing the sensor antenna (16), so that there is a minimum distance between the antenna (16) and the metal of the cooking pot (24) and/or the sensor antenna (16) has a defined direction to the wall of the cooking pot (24).

12. A temperature detection system for a cooking pot (24), wherein said temperature detection system includes a temperature detection assembly (10) and a lid (20) for the cooking pot (24), wherein the lid (20) is provided for receiving the temperature detection assembly (10),
wherein the temperature detection system includes the temperature detection assembly (10) according to claim 1 and the lid (20) comprises an elongated guide tube (22) for receiving the bar (12) of the temperature detection assembly (10), wherein an inner diameter of the guide tube (22) is marginally bigger than an outer diameter of the bar (12).

13. A temperature detection system according to claim 12, wherein the temperature detection system is provided for at least one ISM (industrial, scientific and medical) band.

14. A temperature detection system according to claim 12, wherein the temperature detection system is adaptable to at least one certain ISM band.

15. A cooking hob including a control unit, wherein the cooking hob is provided for a wireless connection to the temperature detection assembly (10) according to claim 1 and/or to a temperature detection system including a temperature detection assembly with a straight and elongated bar (12) which comprises at least one SAW temperature sensor (14), and a lid (20) for the cooking pot (24), wherein the lid (20) is provided for receiving the temperature detection assembly (10), and
the lid (20) comprises an elongated guide tube (22) for receiving the elongated bar (12) of the temperature detection assembly (10), wherein an inner diameter of the guide tube (22) is marginally bigger than an outer diameter of the bar (12), wherein the elongated guide tube (22) extends downwardly from a top surface of the lid (20) and is configured to guide the insertion of the bar (12) into the cooking pot (24).

16. A cooking hob according to claim 15, wherein the cooking hob comprises a reader antenna provided for the wireless connection to the sensor antenna (16) of the temperature detection assembly (10), and a reader electrically connected to the control unit of the cooking hob.

17. A lid (20) for a cooking pot (24), wherein the lid (20) is provided for receiving a temperature detection assembly (10) with a straight and elongated bar (12) which comprises at least one SAW temperature sensor (14), wherein the lid (20) comprises an elongated guide tube (22) for receiving the bar (12) of the temperature detection assembly (10), wherein an inner diameter of the elongated guide tube (22) is marginally bigger than an outer diameter of the bar (12), wherein the elongated guide tube (22) extends downwardly from a top surface of the lid (20) and is configured to guide the insertion of the bar (12) into the cooking pot (24), wherein a non-heat-conducting material is arranged at a lower tip of the bar (12).

18. The lid (20) according to claim 17, wherein the longitudinal axis of the guide tube (22) extends perpendicular to the plane of the lid (20).

19. The lid (20) according to claim 17, wherein a shorter portion of the guide tube (22) extends above the lid (20), while a longer portion of the guide tube (22) extends below the lid (20).

20. The lid (20) according to claim 17, wherein the lid (20) comprises a border (28), wherein the border (28) encloses a circular disk of the lid (20) and extends downwards.

* * * * *